Sept. 26, 1933.  J. B. BAMBENEK  1,928,474
COMBINED SLACK TAKE-UP AND LOCK DEVICE FOR TIRE CHAINS
Filed Oct. 24, 1932

Inventor
Joseph B. Bambenek
By his Attorneys
Merchant & Kitson

Patented Sept. 26, 1933

1,928,474

UNITED STATES PATENT OFFICE 1,928,474

COMBINED SLACK TAKE-UP AND LOCK DEVICE FOR TIRE CHAINS

Joseph B. Bambenek, Winona, Minn., assignor to Peerless Chain Co., Winona, Minn., a corporation of Minnesota Application October 24, 1932. Serial No. 639,175

1 Claim. (Cl. 24—70)

My present invention relates to traction devices for automotive vehicle wheels, commonly called tire chains, and of the type having one or more cross tread members held in place on a tire by a cross chain or other connection which extends over the felly or rim of a wheel between certain of the spokes thereof. This cross chain or connection is usually permanently attached at one end to the traction device and detachably attached thereto at its other end by a lock or fastener passed through one of the outermost links of the cross chain. To compensate for varying sizes of tires to which the traction device is applied, the lock or fastener may be shifted from one of the outermost links to another to vary the operative length of the connection. The length of the links in a cross chain is such that it is difficult to secure proper adjustment of the cross chain with a result that the traction device is often very loose on the tire and will shift or whip during the rotation of the wheel, thus producing considerable noise and unnecessary wear on the tire, rim or felly.

The object of my invention is the provision of an extremely simple and highly efficient combined slack take-up and lock device for the cross chain of a tire traction device. By the use of this invention a cross chain may be closely adjusted to hold a traction device on a tire so that the same will not shift or move thereon.

To the above end, generally stated, the invention consists of the novel devices and combinations of devices hereinafter described and defined in the claim.

In the accompanying drawing, which illustrates the invention, like characters indicate like parts throughout the several views.

Referring to the drawing.

Figure 1:
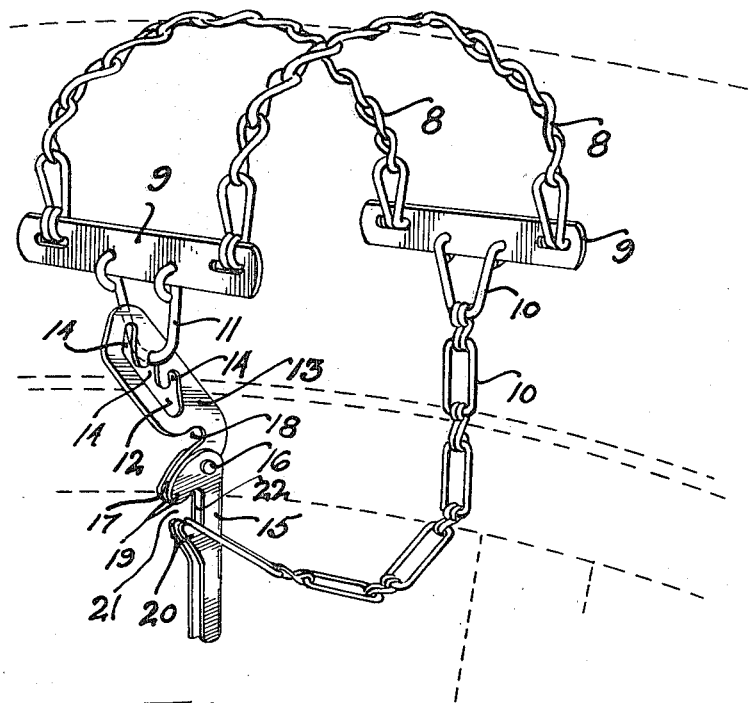
Fig. 1 is a perspective view of the tire traction device having the invention embodied therein and applied to an automotive vehicle fragmentarily and diagrammatically illustrated by means of broken lines, the lock of said device being released.

Of the parts of the automotive vehicle wheel illustrated it is important to note the felly 4, spokes 5, rim 6 and pneumatic tire casing 7.

The tire traction device, as shown, includes a pair of parallel and laterally spaced traction chains 8, the ends of which are secured to a pair of tie bars 9 that engage the sides of the tire 7 and hold said chains transversely across the tread thereof. This traction device is held in place by a cross chain 10 attached at one end to one of the tie bars 9 at its longitudinal center and extends therefrom in the opposite direction from the attached tread chains 8.

Attached to the other tie bar 9 at its longitudinal center is a U-shaped link 11 that projects in the opposite direction from the attached ends of the chains 8. This link 11 forms a part of the combined slack take-up and lock device and its transverse portion extends through a longitudinal slot 12 in one of the end portions of a plate 13 and permanently connects said plate to the respective tie bar 9. Also formed in the plate 13 is a plurality of lock notches 14 that are spaced longitudinally thereof and open into said slot. The link 11 is free for longitudinal movement in the slot 12 for interlocking engagement by a lateral movement into anyone of the lock notches 14 to change or vary the operative length of the plate 13.

A lock lever 15 is attached to the other end portion of the plate 13 by a pivot 16 and projects radially from said pivot. This lever 15 is U-shaped in cross-section, the sides of which are parallel, and engage the plate 13 with a working fit, which extends edgewise therebetween. Inward of the pivot 16 the plate 13 is provided with a pointed retaining lug 17 and still inward of said lug said plate is cut away to form a link-receiving pocket 18. The sides of the lever 15 are provided with a pair of hook-like lock lugs 19 and spaced therefrom said sides are provided with reversely extended and reversely acting hook-like lugs 20. The pairs of lugs 19 and 20 are spaced to form a contracted passageway 21 that leads to a link-receiving pocket 22 in the sides of the lever 15.

Figure 2:
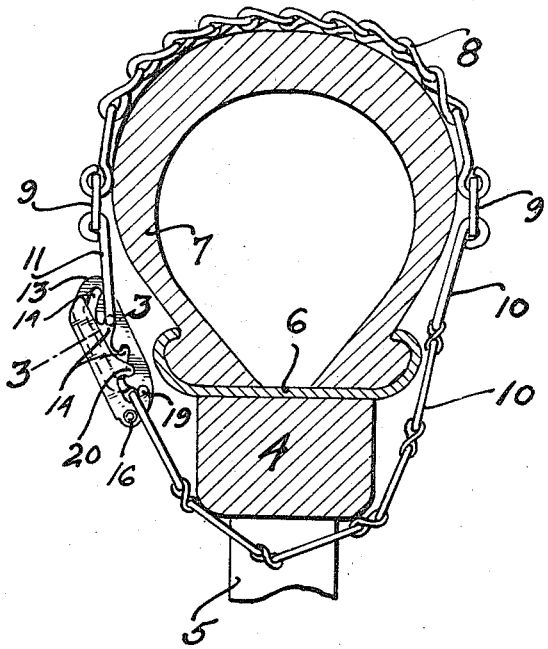
Fig. 2 is a view corresponding to Fig. 1 with the exception that the wheel is shown in transverse section and the traction device is shown in elevation with the lock closed.
Figure 3:
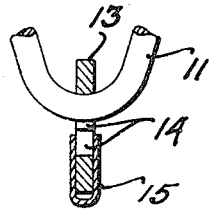
Fig. 3 is a fragmentary detail view with some parts shown in section taken on the line 3—3 of Fig. 2, on an enlarged scale.

To apply the traction device to a tire it will first be loosely placed transversely on the tread of the tire with the cross chain 10 on the inside of the tire and with the combined slack take-up and lock device on the outside thereof, as shown in Fig. 1. The cross chain 10 is next drawn outward over the felly of the wheel and between two of the spokes and the lever inserted through the outermost link in said chain and held by the lugs 20. Next the plate 13 is adjusted on the link 11 to take up the slack in the chain 10 and the lever 15 operated to carry the held link into the pocket 18, as shown in Fig. 2, and thereby tightly draw the tread chain 8 across the tire. When the lock lever 15 is closed the same is held closed by the pull on the chain 10. The slot 12 is closed by the lock lever 15 when in an operative position and prevents the link 11 from moving out of the lock notch 14 in which it is seated.

In actual usage of the invention a rubber tube or other covering will be applied to the chain 10 to prevent the same from marring or cutting the rim or felly of the wheel.

It will be understood that the invention described is capable of various modifications within the scope of the invention herein disclosed and claimed.

What I claim is:

A device of the class described having a plate and a cooperating link, said plate having at one of its end portions a plurality of internal lock notches and a slot connecting said notches, said link being shiftable in the slot from one lock notch to another to vary the operative length of the plate, said plate having at its other end portion a lock pocket and a cooperating link, and a lever pivoted to the plate and having means for holding the last noted link and carrying the same into the lock pocket.

JOSEPH B. BAMBENEK.